United States Patent
Isigami et al.

[11] 3,903,064
[45] Sept. 2, 1975

[54] PHOTODEGRADABLE POLYMER COMPOSITE

[75] Inventors: Masahisa Isigami, Kakogawa; Kunio Arimoto, Takasago; Masao Hamada, Kakogawa, all of Japan

[73] Assignee: Harima Kasei Kogyo Co., Ltd., Kakogawa, Japan

[22] Filed: July 3, 1974

[21] Appl. No.: 485,439

Related U.S. Application Data

[63] Continuation-in-part of Ser. No. 282,688, Aug. 22, 1972, abandoned.

[30] Foreign Application Priority Data

Sept. 27, 1971 Japan.................... 46-74765

[52] U.S. Cl. ....... 260/87.3; 204/159.14; 204/159.2; 260/45.75 R; 260/45.75 C; 260/45.75 N; 260/89.1; 260/91.7; 260/92.8 R; 260/93.5 A; 260/93.7; 260/94.9 GC; 260/DIG. 43

[51] Int. Cl.² ........................................ C08F 210/04

[58] Field of Search ............. 260/DIG. 43, 94.9 GC, 45.75 R, 260/45.75 C, 45.75 N, 93.7, 93.5 A, 92.8 R, 91.7, 89.1, 87.3; 204/159.2, 159.14

[56] References Cited
UNITED STATES PATENTS 3,463,767 8/1969 Bush et al. .................. 260/94.9
3,464,953 9/1969 Newland .................... 260/45.75

*Primary Examiner*—Melvyn I. Marquis
*Attorney, Agent, or Firm*—Moonray Kojima

[57] ABSTRACT

Polymer composite comprising from 0.01 to 5 % by weight of one or more additives of a metal salt of an aromatic ketocarboxylic acid having the general formula:

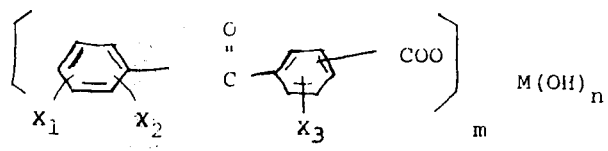

wherein $X_1$, $X_2$ and $X_3$ are selected from the group consisting of hydrogen, halogen, alkyl, hydroxyl, alkoxy, and carboxylalkyl; M is selected from the group consisting of iron, cobalt, nickel, manganese, chromium, zinc, calcium, barium, aluminum and copper, $m$ represents an integer equal to or smaller than the valence number of the metal member, and $n$ represents an integer between 0 and $m-1$, $m + n$ being equal to the valence of the metal member. The composite is degradable in ultraviolet light or sunlight.

5 Claims, No Drawings

PHOTODEGRADABLE POLYMER COMPOSITE

BACKGROUND OF THE INVENTION

This is a continuation-in-part of Ser. No. 282,688 filed Aug. 22, 1972 and now abandoned.

The present invention relates to polymer composites, or compositions in which polymer molecules are readily degradated by exposure to ultraviolet ray and/or sun light.

Consumption of plastic, such as polymers and copolymers of various types, has tended to increase yearly. They have been widely used for semi-permanent use, i.e., as disposable items. In fact, the proportion of disposable plastics in refuse has significantly increased to a point where disposable plastics now pose a significant problem. In the art, plastics have been disposed of in nearly the same way as other garbage is disposed of, namely, by open pit burning or by furnace burning. In either case, there is caused to be generated poisonous gases, excess heat, air pollution, corrosive gases, and in the case of furnaces, deterioration of the furnace. Thus, there exists a substantial need for a better method of disposing of plastics.

The ideal solution to the problem would be to have disposable goods and containers, such as packages and receptacles, made of materials which are brittle and tough when in use, and which degrade after a certain period of time. For example, a soft-drink bottle could be made of such degradable material, and reduce the accumulation of cans and bottles along roadsides, for example.

SUMMARY OF THE INVENTION

After numerous experiments, the present inventors have discovered certain additives for use with plastics, which would produce the desired degradation properties. These additives encompass metal salts of aromatic ketocarboxylic acid having the general formula:

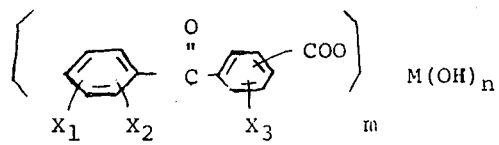

wherein $X_1$, $X_2$ and $X_3$ are selected from the group consisting of hydrogen, halogen, alkyl, hydroxyl, alkoxy, and carboxylalkyl, M is a metal member selected from the group consisting of iron, cobalt, nickel, manganese, chromium, zinc, calcium, barium, aluminum, and copper, m represents an integer equal to or smaller than the valence number of the metal member, and n represents an integer between 0 and $m-1$, with $m + n$ being equal to the valence number of the metal member. Mixtures of two or more additives can be used. It was discovered that a polymer composite comprising from 0.01 to 5.0 % by weight of one or more of the foregoing additives can be easily degradated, after first reaching its hard, brittle state, within a relatively short period of time upon exposure to ultraviolet rays or sunlight. Advantageously, it was also found that the composite did not show any tendency to decay, i.e., degradate, when it was stored in darkness, even for long periods of time.

DETAILED DESCRIPTION OF PREFERRED EMBODIMENTS

The invention will now be described in greater detail together will illustrative examples, which are not to be construed in any limiting way.

The following compounds having the above formula, have been found to be preferred for use as the additive: Fe-2-benzoylbenzoate, Co-2-benzoylbenzoate, Mn-2-benzoylbenzoate, Cr-2-benzoylbenzoate, Zn-2-benzoylbenzoate, Ca-2-benzoylbenzoate, Al-2-benzoylbenzoate, Cu-2-benzoylbenzoate, Fe-2-(4-methylbenzoyl)benzoate, Co-2-(4-methylbenzoyl)benzoate, Cu-2-(4-methylbenzoyl)benzoate, Cr-2-(4-methylbenzoyl)benzoate, Cu-2-(2,4-dimethylbenzoyl)benzoate, Co-2-(2,4-dimethylbenzoyl)benzoate, Mn-2-(2,4-dimethylbenzoyl)benzoate, Fe-2-(4-isopropylbenzoyl)benzoate, Co-2-(4-isopropylbenzoyl)benzoate, Cu-2-(4-isopropylbenzoyl)benzoate, Fe-2-(4-chlorobenzoyl)benzoate, Cu-2-(4-chlorobenzoyl)benzoate, Cu-2-(4-methoxybenzoyl)benzoate, Cu-6-benzoyl phthalate, and Fe-2-(2,4-dimethylbenzoyl)benzoate.

Aromatic ketocarboxylic acid metal salts may be easily prepared by neutralizing aromatic ketocarboxylic acid with metal hydroxide or metal carbonate. The aromatic ketocarboxylic acid may be easily obtained by reacting benzene, toluene, xylene, methoxybenzene, or chlorobenzene with aromatic acid chloride or aromatic acid anhydride in the presence of Friedel-Craft's catalyst. Friedel-Craft's catalysts are well known types of catalysts and may comprise aluminum chloride, boron fluoride, etc.

In accordance with the present invention polymer composite may be produced by mixing plastic material, such as copolymer and polymers, together with at least one of the additives having the above mentioned formula, in an amount of from 0.01 to 5.0%, preferably from 0.05 to 1.0% based on the weight of the plastic material.

Less than 0.01% does not bring about sufficient degradation, while over 5.0% would produce some degradation, but under conditions where such degradation would not be desirable.

If it is necessary to stabilize the plastics in the course of processing, any known stabilizer may be used together with the present additives. In this case, also, known pigments and known filling materials may be used satisfactorily together with the inventive additives.

In accordance with the present invention, the additives may be combined with the plastic material using any conventional formulation procedure, such as blending the plastic material and additive together using a hot roll, admixing both materials using a suitable blending implement, or formulating the desired composite or composition with the plastic material and additive in dispersants or solvents which are afterwards removed from the polymer composite system thus produced.

The plastic material used in this invention may comprise polyethylene, polypropylene, polystyrene, polyvinylchloride, polyvinylidenechloride polyvinylacetate, and copolymers of monomers of these plastic polymers, such as ethylene-vinylacetate copolymer, and/or mixtures of these polymers. Other suitable plastic may also be used.

The following detailed examples are set forth to illustrate the invention and are not to be construed in any limiting sense.

EXAMPLE 1

To pulverized polypropylene, M 10000, there was added a fixed amount of the additive shown in Table 1, in chloroform. The resulting mixture was thoroughly mixed with agitation. The chloroform was then removed from the resultant mixture by vacuum distillation using a vacuum evaporator. Then, the mixture was pressed and heat stretched to a film of about 0.1 mm thickness, 2 cm width and 5 cm length. The film thus obtained was exposed to the outdoor atmosphere at Kakogawa City, Hyogo Prefecture in Japan during the month of July and tests were made of its physical properties, such as resistance to degradation and resistance against yielding of carboxyl radical. Resistance to degradation was measured by a 180 angle folding-breakage test, wherein the samples were tested for breakage by 180 folding at the end of a period of time after exposure. Resistance to yielding of carboxyl radical was measured by detecting its presence at $1,710^{-cm}$ absorption band with an infrared spectrophotometer tester. It is indicated by the time duration when the carboxyl radical is detected.

The results are shown in Table 1. The listed value represents an average of five values taken from five tests.

EXAMPLE 2

To pulverized polypropylene, M 100000, there was added a fixed amount of the additives shown in Table II and anti-oxidant Topanol CA (Trade Name of ICI's anti-oxidant of the phenolic type) in chloroform. The resulting mixture was thoroughly mixed with agitation. Chloroform was removed therefrom by vacuum distillation using a vacuum evaporator. The mixture was pressed to a thin film of about 0.01 mm thickness, 2 cm width, and 5 cm length. The film thus obtained was exposed to the outdoor atmosphere at Kakogawa City, Hyogo Prefecture, Japan, during the month of July. Tests were performed to measure various properties of the film, such as resisting power to degradation, using the method and procedure set forth in Example 1. The results are shown in Table II.

EXAMPLE 3

On a hot roll using a temperature of 140C there was melted a commercially low density polyethylene, M 30000. Added thereto was a fixed amount of the additives shown in Table III. The mixture was blended thoroughly. The melted substance obtained thereby was rollpressed at 160C and heat stretched, to a film of about 0.1 mm thickness, 2 cm width, and 5 cm length and allowed to stand to cool. The film thus obtained was exposed to the outdoor atmosphere at Kakogawa city, Hyogo Prefecture, Japan during the summer season (namely July). The period of time of exposure required for cracks to appear on the surface of the composite was observed. The results are shown in Table III.

Table I

| | Additive | Added amount (%) | Resistance to degradation (day) | Period of time required for carbonyl radical yielding (day) |
|---|---|---|---|---|
| 1. | Cu-2-benzoylbenzoate | 0.01 | 8 | 4 |
| 2. | | 0.1 | 4 | 1 |
| 3. | | 0.5 | 2 | 1 |
| 4. | Fe-2-benzoylbenzoate | 0.1 | 3 | 1 |
| 5. | Co-2-benzoylbenzoate | 0.1 | 5 | 2 |
| 6. | Zn-2-benzoylbenzoate | 0.1 | 7 | 4 |
| 7. | Cu-2-(4-methylbenzoyl)benzoate | 0.1 | 4 | 1 |
| 8. | Fe-2-(4-methylbenzoyl)benzoate | 0.01 | 7 | 4 |
| 9. | | 0.1 | 4 | 1 |
| 10. | | 0.5 | 2 | 1 |
| 11. | Cu-2-(2,4-dimethylbenzoyl)benzoate | 0.1 | 3 | 1 |
| 12. | none | — | 18 | 12 |

The degree of decaying of the polymer composite may be desirably controlled by use of suitable antioxidant together with the additive in suitable amounts and in suitable ratios therebetween. Well known antioxidants may be used, such as 2,6 di-tertiary butyl-4-methyl phenol; 2,2-methylene-bis-(4-methyl-6-tertiary butyl phenol); 4,4-butylidene-bis-(3-methyl-6-tertiary butyl phenol); phenyl-beta-naphthylamine; 4,4-thio-bis-(3-methyl-6-tertiary butyl phenol), 2,2-thio-bis-(4-methyl-6-tertiary butyl phenol), dilauryl thiodipropionate, or triphenyl phosphite.

EXAMPLE 4

On a hot roll using a temperature of 120C there was melted an ethylene-vinylacetate copolymer (vinylacetate 14.7%; melt index of 1.4), which is a suitable raw material for film production. A fixed amount of additives shown in Table IV were added thereto. The mixture was blended and pressed at 160C to produce a film of about 0.1 mm thickness, 2 cm width and 5 cm length.

Table II

| Additive | added quantities (%) | anti-oxidant | added quantities (%) | Resistance to degradation(day)* | Period of time required to yield carbonyl radical (day)* |
|---|---|---|---|---|---|
| 1. Cu-2-benzoyl benzoate | 0.1 | no addition | — | 4 | 1 |
| 2. Cu-2-benzoyl benzoate | 0.1 | Topanol CA | 0.01 | 7 | 4 |

Table II-continued

| Additive | added quantities (%) | anti-oxidant | added quantities (%) | Resistance to degra-dation(day)* | Period of time required to yield carbonyl radical (day)* |
|---|---|---|---|---|---|
| 3. Cu-2-benzoyl benzoate | 0.1 | | 0.02 | 10 | 5 |
| 4. Cu-2-benzoyl benzoate | 0.1 | | 0.05 | 14 | 7 |
| 5. Cu-2-benzoyl benzoate | 0.5 | | 0.01 | 5 | 2 |

*Note: *In TAble II, each value was taken from the average of five values measured.

Table V

| Additive | Amount Added (%) | Resistance to degrada-tion (days) | Time required for yielding of carbon-yl radicals (days) |
|---|---|---|---|
| 1. Cu-2-benzoyl benzoate | 0.2 | 25 | 9 |
| 2. Cu-2-benzoyl benzoate | 0.5 | 12 | 4 |
| 3. Fe-2-benzoyl benzoate | 0.5 | 15 | 5 |
| 4. Co-2-benzoyl benzoate | 0.5 | 14 | 5 |
| 5. Cu-2-(4-methylbenzoyl) benzoate | 0.5 | 11 | 4 |
| 6. none | — | 50 | 20 |

Table III

| Additive | Amount added (%) | Period of time required for cracks to appear (days)* |
|---|---|---|
| 1. None | — | 26 |
| 2. Cu-2-benzoyl benzoate | 0.1 | 7 |
| 3. Cu-2-benzoyl benzoate | 0.5 | 5 |
| 4. Fe-2-benzoyl benzoate | 0.1 | 6 |
| 5. Cu-2-(4-methylbenzoyl) benzoate | 0.1 | 7 |

Note:*In Table III, each value was taken from the average of five values measured in separate tests.

Table IV

| Additive | Amount added (%) | Period of time required for cracks to appear (days)* |
|---|---|---|
| 1. none | — | 32 |
| 2. Cu-2-benzoyl benzoate | 0.1 | 8 |
| 3. Cu-2-benzoyl benzoate | 0.5 | 7 |
| 4. Cu-2-benzoyl benzoate | 1.0 | 6 |
| 5. Fe-2-benzoyl benzoate | 0.1 | 8 |
| 6. Al-2-(4-methylbenzoyl) benzoate | 0.5 | 13 |

Note:*In Table IV, each value represents the average of five values actually measured in separate tests.

The film was exposed to the outdoor atmosphere during the summer (namely July). The period of time of exposure required for cracks to appear on the surface of the polymer composite was measured. The results are shown in Table IV above.

EXAMPLE 5

On a hot roll, there was blended styrene, M 400000, with a fixed amount of additives shown in Table V and holding the mixture temperature at about 180C. Then, the mixture was roll-pressed at about 200C to a film of about 0.1 mm thickness, 2 cm width and 5 cm length. The film was exposed to the outdoor atmosphere at Kakogawa city, Hyogo Prefecture, Japan, during the summer (namely, July). The period of time of exposure required for degradation of the film composition to such an extent that the film easily broke into flakes during the course of normal handling, was measured. Also, the time required for yielding of carbonyl radicals from the film composition molecules to such an extent that the radicals could be observed at the $1720^{-cm}$ absorption band, was measured. The results are shown in the below Table V.

The foregoing description is intended to be illustrative of the principles of the invention. Numerous variations and modifications thereof would be apparent to the worker skilled in the art. All such variations and modifications are to be considered to be within the spirit and scope of the invention.

What is claimed is:

1. A polymer composite comprising a polymer or copolymer selected from the group consisting of polyethylene, polypropylene, polystyrene, polyvinyl chloride, polyvinylidene chloride, polyvinyl acetate, and mixtures thereof, and one or more compounds of metal salts of an aromatic ketocarboxylic acid of the general formula:

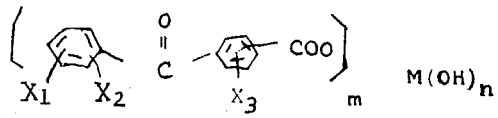

wherein $X_1$, $X_2$ and $X_3$ are selected from the group consisting of hydrogen, halogen, alkyl, hydroxyl, alkoxy, and carboxyalkyl, M is a metal member selected from the group consisting of iron, cobalt, nickel, manganese, chromium, zinc, calcium, barium, aluminum, and copper, $m$ represents an integer equal to or smaller than the valence number of said metal member, and $n$ represents an integer from 0 to $m1$, wherein $m + n$ equals the valence number of said metal member, said one or more compounds being in an amount of from 0.01 to 5.0 percent based on the weight of said polymer or copolymer.

2. The polymer composite of claim 1, wherein said polymer or copolymer is a polyolefin.

3. The polymer composite of claim 1, wherein said polymer or copolymer is a copolymer of ethylene and vinyl acetate.

4. The polymer composite of claim 1, wherein said one or more compounds is in an amount of from 0.05 to 1.0 % by weight.

5. The polymer composite of claim 1, wherein said polymer or copolymer is a polyolefin and said one or more compounds is from 0.01 to 5.0 % by weight of metal benzoyl benzoate or derivatives thereof.

* * * * *